(12) United States Patent
Itoh et al.

(10) Patent No.: US 7,856,146 B2
(45) Date of Patent: Dec. 21, 2010

(54) IMAGE PROCESSING DEVICE, IMAGE FORMING DEVICE, IMAGE PROCESSING METHOD AND PROGRAM

(75) Inventors: Atsushi Itoh, Ashigarakami-gun (JP); Etsuko Ito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1047 days.

(21) Appl. No.: 11/354,193

(22) Filed: Feb. 15, 2006

(65) Prior Publication Data

US 2006/0204102 A1    Sep. 14, 2006

(30) Foreign Application Priority Data

Mar. 10, 2005  (JP) ............................. 2005-067913
Feb. 7, 2006  (JP) ............................. 2006-029886

(51) Int. Cl.
G06K 9/36 (2006.01)
G06K 9/46 (2006.01)
G06K 9/34 (2006.01)
G06K 9/66 (2006.01)
G06K 9/48 (2006.01)

(52) U.S. Cl. ...................... 382/192; 382/276; 382/190; 382/173; 382/199; 382/202; 382/195; 382/180

(58) Field of Classification Search .................. None
See application file for complete search history.

(56) References Cited

U.S. PATENT DOCUMENTS

| | | | | |
|---|---|---|---|---|
| 4,528,692 A * | 7/1985 | Umeda et al. | ............... | 382/179 |
| 4,649,377 A * | 3/1987 | Urabe | ............... | 345/536 |
| 5,181,258 A * | 1/1993 | Nagao et al. | ............... | 382/206 |
| 5,430,810 A * | 7/1995 | Saeki | ............... | 382/281 |
| 5,583,949 A * | 12/1996 | Smith et al. | ............... | 382/199 |
| 5,751,921 A * | 5/1998 | Fujimoto | ............... | 358/1.9 |
| 5,754,832 A * | 5/1998 | Sasaki | ............... | 715/255 |
| 5,768,412 A * | 6/1998 | Mitsuyama et al. | ......... | 382/173 |
| 5,936,605 A * | 8/1999 | Munjal | ............... | 345/102 |
| 6,046,794 A * | 4/2000 | Ichihara | ............... | 355/75 |
| 6,160,916 A * | 12/2000 | Horiuchi | ............... | 382/232 |
| 6,289,125 B1 * | 9/2001 | Katoh et al. | ............... | 382/194 |
| 6,507,670 B1 * | 1/2003 | Moed | ............... | 382/172 |

(Continued)

FOREIGN PATENT DOCUMENTS

CN    1550971 A    12/2004

(Continued)

OTHER PUBLICATIONS

A. Antonacopoulos and RT Ritchings, "Flexible Page Segmentation Using the Background", 1994, IEEE.*

(Continued)

Primary Examiner—Vikkram Bali
Assistant Examiner—Michelle Entezari
(74) Attorney, Agent, or Firm—Oliff & Berridge, PLC (57) ABSTRACT

An image processing device has a division determination unit. The division determination unit determines the partition number of an image in input image data. The division determination unit calculates the image features of the image in the image data, the features existing in reference areas, and, on the basis of the image features, determines the partition number of the image in the image data.

14 Claims, 4 Drawing Sheets

U.S. PATENT DOCUMENTS

| | | | |
|---|---|---|---|
| 6,674,905 B1* | 1/2004 | Matsugu et al. | 382/199 |
| 6,720,965 B1* | 4/2004 | Hirosawa et al. | 345/423 |
| 6,771,383 B1* | 8/2004 | Ogaki et al. | 358/1.15 |
| 6,868,183 B1* | 3/2005 | Kodaira et al. | 382/203 |
| 6,947,076 B1* | 9/2005 | Kitaguchi et al. | 348/218.1 |
| 6,990,233 B2* | 1/2006 | Park et al. | 382/164 |
| 7,184,167 B1* | 2/2007 | Ito et al. | 358/1.18 |
| 7,202,491 B2* | 4/2007 | Garssen et al. | 250/559.29 |
| 7,336,378 B2* | 2/2008 | Ichikawa et al. | 358/1.11 |
| 7,450,869 B2* | 11/2008 | Geleynse et al. | 399/31 |
| 7,529,407 B2* | 5/2009 | Marquering et al. | 382/176 |
| 7,667,713 B2* | 2/2010 | Suino et al. | 345/600 |
| 2003/0152293 A1* | 8/2003 | Bresler et al. | 382/305 |
| 2004/0052401 A1* | 3/2004 | Suzaki | 382/100 |
| 2004/0114947 A1* | 6/2004 | Geleynse et al. | 399/31 |
| 2004/0175031 A1* | 9/2004 | Katsuyama | 382/165 |
| 2004/0234169 A1 | 11/2004 | Tojo | |
| 2005/0140991 A1* | 6/2005 | Ogiwara et al. | 358/1.2 |

FOREIGN PATENT DOCUMENTS

| | | |
|---|---|---|
| JP | A 5-292294 | 11/1993 |
| JP | 06162195 A * | 6/1994 |
| JP | A 6-176153 | 6/1994 |
| JP | A 6-337939 | 12/1994 |
| JP | A 7-236051 | 9/1995 |
| JP | A 08-265549 | 10/1996 |
| JP | A 9-289586 | 11/1997 |
| JP | A 2003-078724 | 3/2003 |
| JP | A 2003-91730 | 3/2003 |
| JP | A 2003-109007 | 4/2003 |
| JP | 2004286952 A * | 10/2004 |

OTHER PUBLICATIONS

Sep. 14, 2010 Office Action issued in Japanese patent application No. 2006-029886 (with translation).

* cited by examiner

IMAGE PROCESSING DEVICE, IMAGE FORMING DEVICE, IMAGE PROCESSING METHOD AND PROGRAM

BACKGROUND

1. Technical Field

The present invention relates to the processing of image data for N-up printing on one sheet.

2. Related Art

A conventional printer or a copying machine is provided with an N-up printing function in which images of several pages are compiled and output on one sheet (refer to Japanese patent publication JP07-A-236051, for example).

As described above, the conventional technique discloses a function for compiling several individual images (hereafter called split image(s)) on one sheet. The technique, however, does not disclose a function for determining whether the image data on a sheet includes several split images. When re-editing and printing a split image from image data on one page, it is necessary to perform a manipulation operation. Namely, a user views image data on a page and selects a split image which is either cut out or input as a reference number of the split image to be output.

SUMMARY

The present invention has been made in view of the above circumstances and the aim of the present invention is to provide an image processing device, an image forming device, an image processing method and a program.

According to an aspect of the present invention, the present invention provides an image processing device including a division determination part for determining a partition number of an image in input image data; calculating image features of the image in the image data, the features existing in reference areas predetermined in correspondence with the blank spaces between split images, and according to the calculation based on the image features, determining the partition number of the image in the image data.

BRIEF DESCRIPTION OF THE DRAWINGS

Embodiments of the present invention will be described in detail based on the figures, wherein.

DETAILED DESCRIPTION

Figure 1:
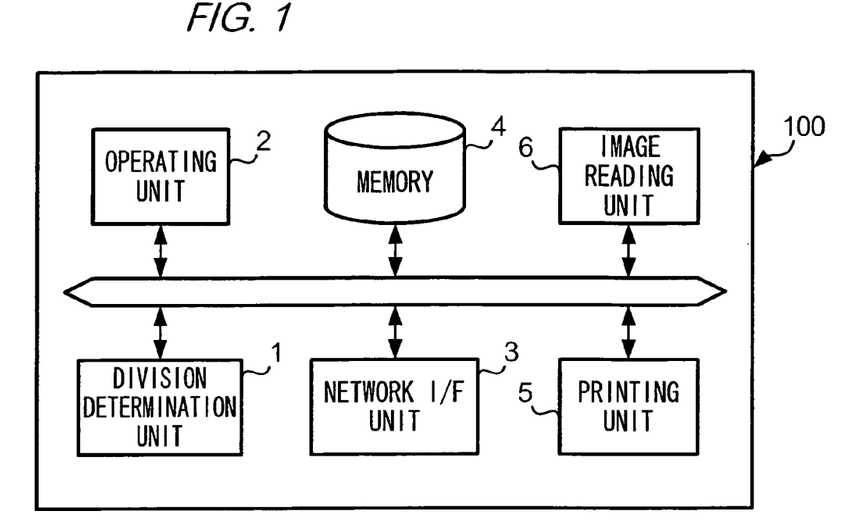
FIG. 1 is a block diagram illustrating an image forming device according to an embodiment of the present invention.

FIG. 1 is a block diagram showing an image forming device 100 according to an embodiment of the invention.

As shown in the figure, the image forming device 100 of the present invention includes a division determination unit 1, an operating unit 2, a network I/F unit 3, a memory 4, a printing unit 5, and an image reading unit 6.

The printing unit 5 is equipped with a photoreceptor, an exposure unit, a development unit, a transfer unit, and a fixing unit; the printing unit 5 forms a toner image on the basis of the image data provided by the division determination unit 1 and fixate the toner image on paper which is a recording material.

The operating unit 2 is provided with a display formed by a liquid crystal display (not shown) and various buttons for receiving instructions from a user. A user is able to select suitable paper for printing or to give a setting instruction for printing.

The image reading unit 6 scans the image of a sheet of paper mounted on a reading surface (not shown) and outputs the image as image data.

The memory 4 stores image data read by the image reading unit 6.

Data communication is realized between the division determination unit 1, the operating unit 2, the memory 4, the printing unit 5, and the image reading unit 6 through the network I/F unit 3.

Figure 2:
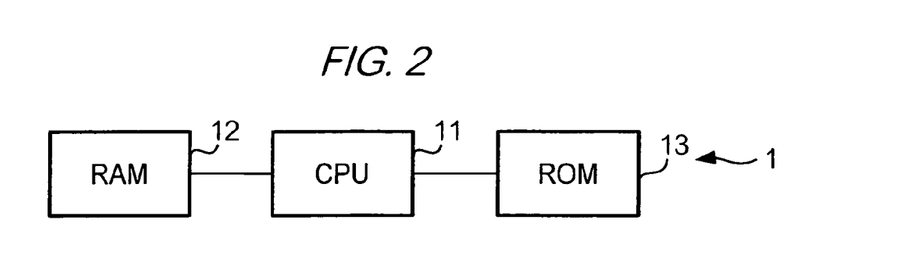
FIG. 2 is a block diagram illustrating a configuration of a division determination part in the image forming device according to the embodiment.
Figure 3A:
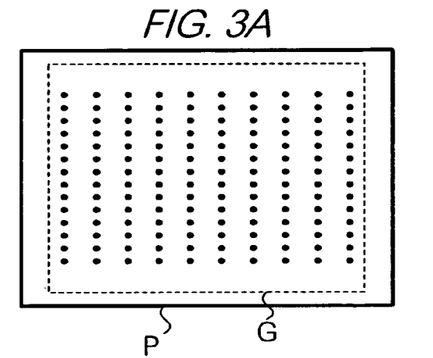
FIG. 3 is a diagram explaining the method for printing on paper which is a recording material.
Figure 3B:
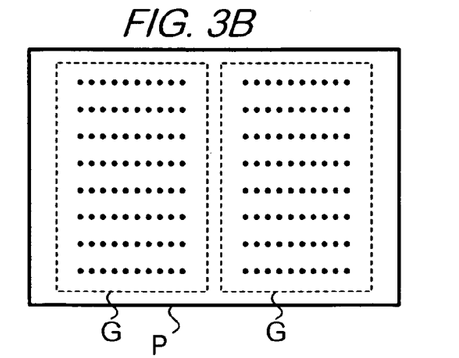
Figure 3C:
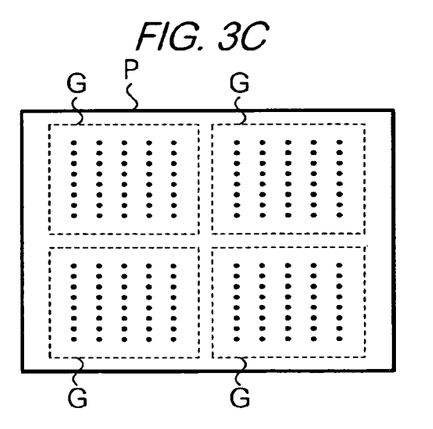
Figure 3D:
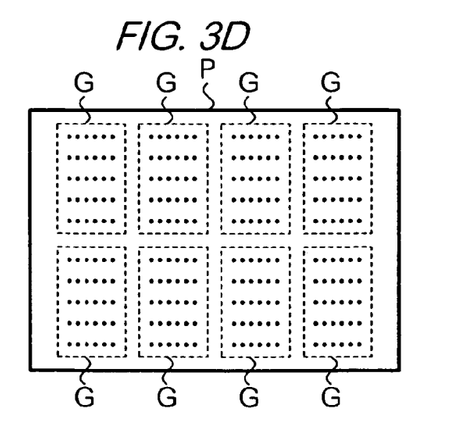

As shown in FIG. 2, the division determination unit 1 has CPU (Central Processing Unit) 11, RAM (Random Access Memory) 12 and ROM (Read Only Memory) 13; the unit controls each part of the image forming device 100 and performs various calculations for implementing image processing on the input image data. When image processing is implemented, image data is temporarily stored in RAM 12. ROM 13 stores an image processing program PRG for performing various types of printing.

ROM 13 stores reference area map data used for referring images of predetermined areas in one sheet of paper.

As shown in FIG. 3, the type for printing on paper includes: printing an image G on the overall surface of one sheet of paper P (not an N-up printing); printing several images on one sheet of paper P (N-up printing). In printing a split image, for example, 2 pages of image G are printed on one sheet of paper P (2up), as shown in FIG. 3B; 4 pages of image G are printed on one sheet of paper P (4up), as shown in FIG. 3C; 8 pages of image G are printed on one sheet of paper P (8up), as shown in FIG. 3D.

Figure 4A:
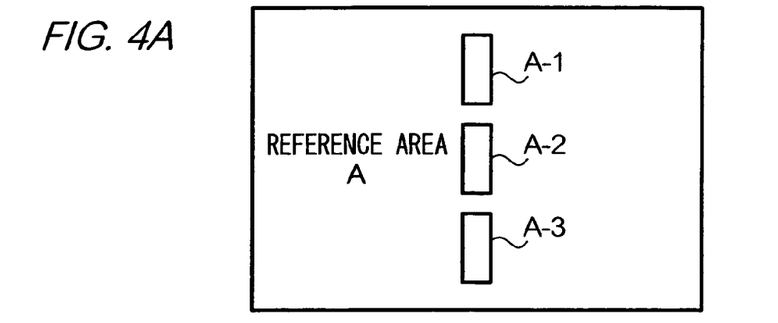
FIG. 4 is a diagram illustrating reference area map data used in division determination of an image.

The reference area map data A includes several map data respectively formed by reference areas A, B, C in accordance with the type of printing an image on paper P as shown in FIG. 4A.

As shown in FIG. 4A, reference area map data A includes three reference areas A-1, A-2, A-3 arranged in a longitudinal direction at the center of a cross direction within an overall frame. The reference areas A-1, A-2, A-3 are arranged in a direction corresponding to a blank between images; wherein, the blank exists at the center of a cross direction of paper P printed by 2-up.

Figure 4B:
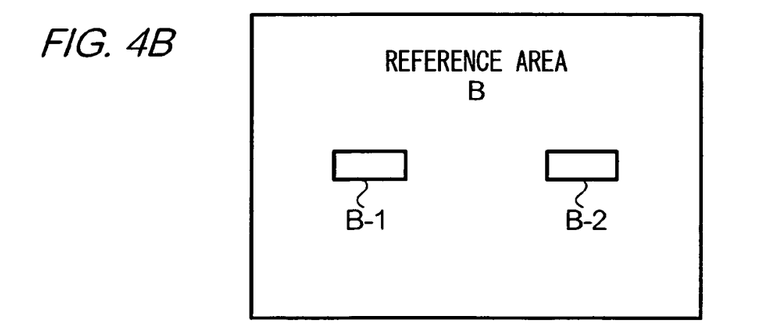

As shown in FIG. 4B, reference area map data B includes two reference areas B-1 and B-2 arranged in a cross direction at the center of longitudinal direction within an overall flame. The reference areas B-1 and B-2 are arranged in a direction corresponding to a blank between images; wherein, the blank exists at the center of longitudinal direction of paper P printed by 4-up.

Figure 4C:
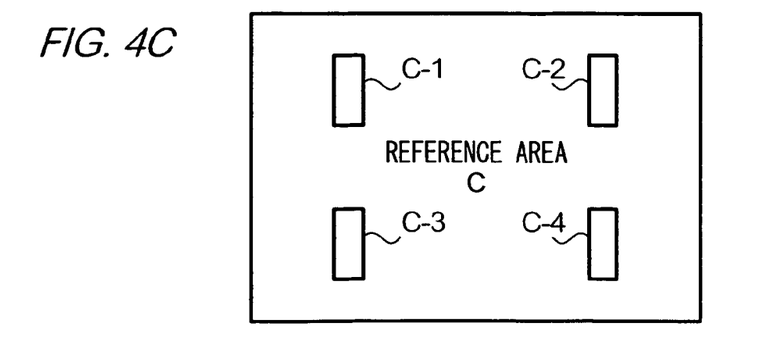

As shown in FIG. 4C, reference area map data C includes reference areas C-1, C-2, C-3, and C-4 arranged two by two in a longitudinal direction at the center of a cross direction within areas divided bilaterally. The reference areas C-1, C-2, C-3, and C-4 are arranged in a direction corresponding to a blank between images; wherein, the blank exists at the center of a cross direction existing in areas formed by bilaterally dividing paper P printed by 8-up.

Figure 5:
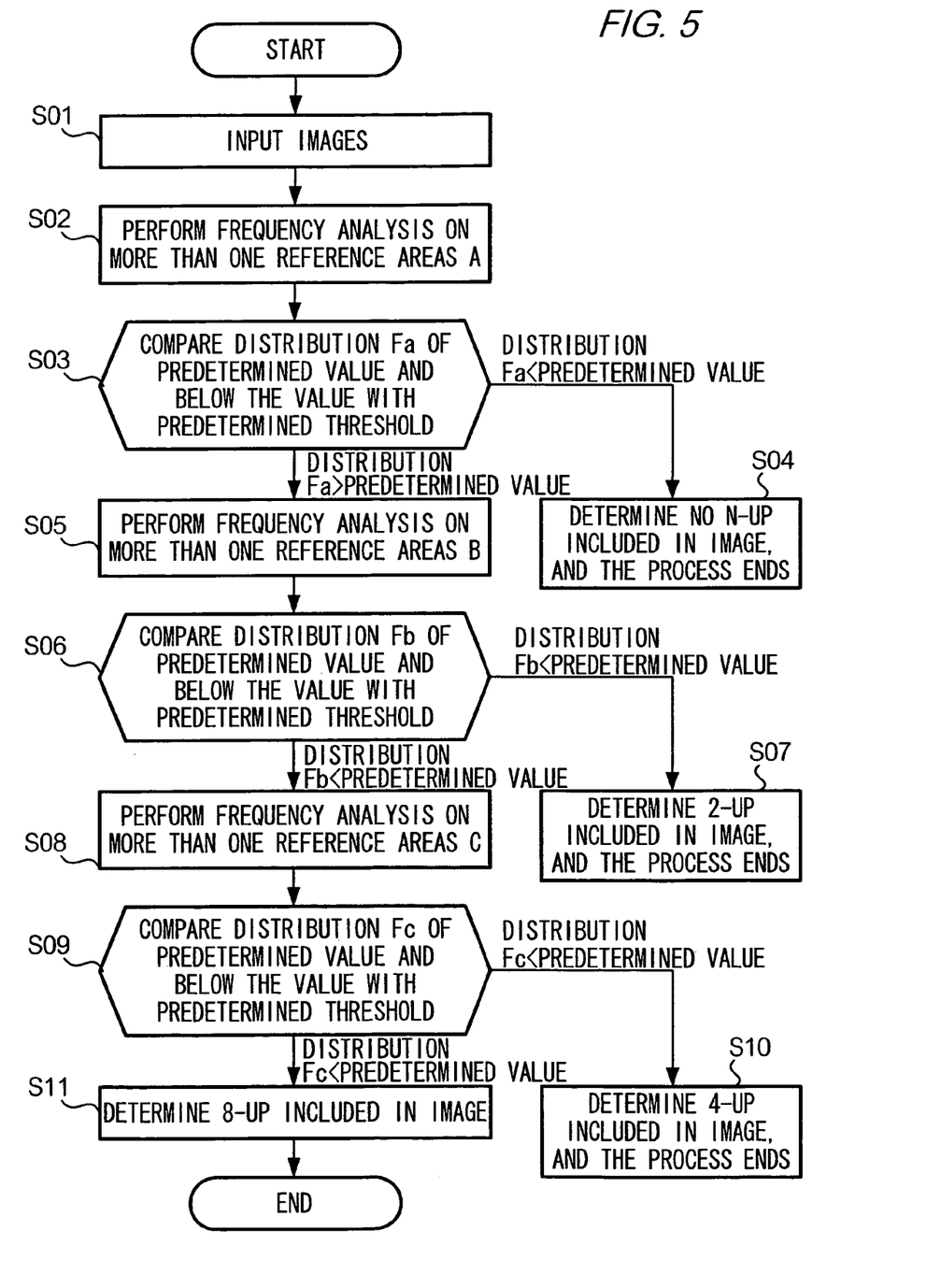
FIG. 5 is a flowchart illustrating the process of division determination of an image performed by a division determination unit.

The operation example of the image forming device 100 will be explained by referring to the flowchart shown in FIG. 5.

When an image is read by the image reading unit 6 (step S01), the image data of the image is sent to division determination unit 1; then, the division determination unit 1 performs a division determination on the read image.

Firstly, the division determination unit 1 extracts reference area map data A from ROM 13 to perform a frequency analysis on reference areas A-1, A-2, A-3 of the reference area map data A (step S02). In the frequency analysis according to an embodiment of the present invention, image features are calculated from density distribution in a reference area More specifically, the division determination unit 1 calculates average densities in reference areas A-1, A-2, A-3 as their image features. The technique for calculating an average density in an area is described, for example, in the Japanese patent publication JP09-A-289586.

The division determination unit 1 then compares, for each of reference areas A-1, A-2, A-3, the average densities Fa with a predetermined density set as a threshold value (step S03).

When determining that any one of the average density Fa is larger than the predetermined threshold value (namely, some information exists on one of the reference areas A-1, A-2, A-3), the division determination unit 1 determines that the image G exists on the overall surface of the paper P; namely, not an N-up printing, and ends the process (step S04).

On the contrary, if all the average densities Fa are less than or equal to the predetermined threshold value, the division determination unit 1 determines that no information exists on the reference areas A-1, A-2, A-3.

Next, the division determination unit 1 extracts reference area map data B from ROM 13 to perform a frequency analysis on reference areas B-1 and B-2 of the reference area map data B (step S05).

The division determination unit 1 then compares the average densities Fb, which are determined by performing a frequency analysis, with a predetermined threshold value (step S06).

When determining that any one of the average densities Fb is larger than the predetermined threshold value, as the result of the comparison between the average densities Fb and the predetermined threshold value, the division determination unit 1 determines that the image G is adapted to 2-up printing and ends the process (step S07).

When determining that all the average densities Fb are less than or equal to the predetermined threshold value, as a result of a comparison between the average densities Fb and the predetermined threshold value, the division determination unit 1 extracts reference area map data C from ROM 13 to perform a frequency analysis on reference areas C-1, C-2, C-3, and C-4 of the reference area map data C (step S08).

The division determination unit 1 then compares the average densities Fc, which are determined by performing a frequency analysis, with a predetermined threshold value (step S09).

When determining that any one of the average densities Fc is larger than the predetermined threshold value, as a result of a comparison between the average densities Fc and the predetermined threshold value, the division determination unit 1 determines that the image G is adapted to 4-up printing and ends the process (step S10); whereas, when determining that all the average densities Fc are less than or equal to the predetermined threshold value, the division determination unit 1 determines that the image G is adapted to 8-up printing and ends the process (step S11).

The division determination unit 1 which performed a division determination on the image stores the image data of the image and the division determination result of the image in the memory 4, and displays the division determination result on the screen of the operating unit 2. According to such configuration, a user is able to realize from the display of the screen on the operating unit 2 whether a read image includes a split image.

Next, an explanation will be given with regard to printing images in the printing unit 5.

Figure 6:
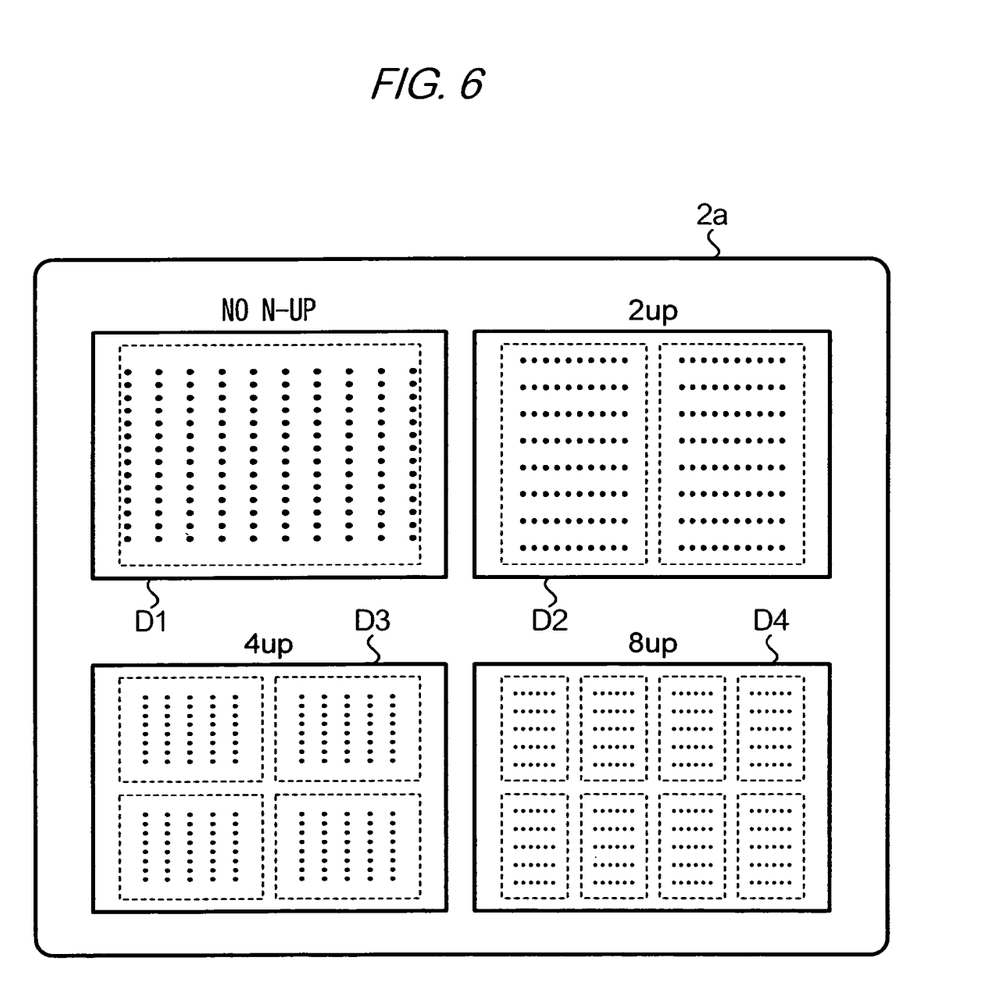
FIG. 6 is a diagram illustrating a print preview displayed to a user at the time of printing.

When a user selects printing mode of an image by manipulating the operating unit 2, the candidates of a split image are displayed by a print preview on the screen of operating unit 2 as images to be printed.

As shown in FIG. 6, the print preview is a candidate of several print images on the display 2a equipped with the operating unit 2 and is provided with a touch panel; the candidates of print image by no N-up, 2up, 4up, 8up are respectively displayed as D1, D2, D3, and D4.

The user then selects any one of the displayed candidates D1, D2, D3, and D4 displayed on the display 2a by touching with a finger, for example. In response to the selection, the image data of the selected candidate is output to the printing unit 5, and the printing unit 5 recognizes the partition number selected for the output image and prints the image including the selected partition number on paper P.

For example, if a user selects the candidate display D1 indicating that no N-up is required, the image data of D1 is output to the printing unit 5, and the printing unit 5 recognizes that the image to be output is not a split image and prints one image on paper P. Or, if the user selects any one of the displayed candidates D2, D3, and D4 for printing a split image of more than 2-up, the image data of the selected candidate output to the printing unit 5, and the printing unit 5 recognizes the partition number selected for the output image and prints the image including the selected partition number on paper P.

As describe above, the image forming device 100, on the basis of the image features calculated from density distribution of an image in a reference area, enables the division determination unit 1 to determine whether an image is a split image; and when the image is a split image, to determine whether the split image is adapted to N-up printing. According to the configuration, a user is not required to determine as to whether an image is a split image; and if the image is a split image, as to determine whether the image is adapted to N-up printing, thereby facilitating the setting of a printing on the basis of the image data.

In the division determination of an image by the division determination unit 1, map data of reference areas A, B, and C are sequentially referred; in another embodiment, map data of reference areas A, B, and C may simultaneously be referred to for the determination.

Here, it should be noted that a density histogram expressing a distribution of density in a reference area might be used in stead of an average density in a reference area when performing a frequency analysis. More specifically, the division determination unit 1 generates density histogram from the density distribution in a reference area. The division determination unit 1 calculates an area of a sub-portion of the density histogram corresponding to densities not larger than a predetermined density, and calculates an area ration of the sub-portion to the whole density histogram. The division determination unit 1 then compares the calculated area ration with a predetermined value. If the area ration thus calculated for a reference area is lower than the predetermined value, the division determination unit 1 determines that information exists on the reference area. The technique for calculating a density histogram in an area is described, for example, in the Japanese patent publication JP09-A-289586.

Also, it should be noted that, in stead of using density distribution in a reference area to calculate an average density or to generate density histogram, input image data processed by a spatial differentiation technique, such as Sobel filtering, may be used to determine whether information exists on a reference area. The image data thus processed (it will also be referred as differentiated data) are known to indicate edges between an image and a blank. Alternatively, a variance may be calculated for a histogram of differentiated data in a reference area, and be used for the above-mentioned determination.

Furthermore, in the above, it is assumed that images to be inputted are formed on a white sheet such as white paper. However, even if images are formed on a single colored sheet, the above-mentioned techniques may be applied after a color of the sheet is extracted from image input data. The techniques may be applied using an average density or a density histogram of a reference area calculated or created with respect to the extracted color of the sheet.

In an embodiment, the division determination unit 1 determines the partition number by eliminating the images in the edge of paper P and by counting the eliminated number. As a result, it is possible to determine whether an image is a split image from the portions excluding blanks between images; and accordingly, to achieve the determination promptly.

In an embodiment, the division determination unit 1 may be configured to improve the accuracy of a division determination by comparing the similarities in the predetermined area in an image. For example, if the same character or a mark exists in the header of each split image, the pattern of density distribution for all split images would be similar, therefore, if the same pattern appears in the density distribution in the same position (for example, upper right portion of an image corresponding to page 1) for each distributed image which is determined as a split image, the images have a high possibility of being determined as a split image. When an OCR (Optical Character Reader) is adopted in this process, a character recognition function is performed; if the same company name or names appear in the same position in the images determined as split images, the possibility increases that the pages are different pages and the determination that the images are split images is correct. As described above, by adding the determination of similarities in features that appear in split images, the accuracy in division determination is improved.

In the embodiment described above, a split image of up to 8-up was illustrated; however, the maximum partition number of the split image is not limited to 8-up.

In the embodiment described above, the division determination unit 1 performs a division determination on the basis of the density distribution in reference areas predetermined in correspondence with the blank spaces between a split image; in another embodiment, a projection analysis may also be performed on an image in the image data. In further embodiment, a projection analysis may also be performed on differentiated data described above. The technique of a projection analysis is described, for example, in the Japanese patent publication JP2003-A-109007.

In a division determination using projection analysis, the division determination unit 1 performs a division determination of an image as follows.

Firstly, the division determination unit 1 performs a projection analysis on images of input image data, for example, along with a first direction which is a cross direction and calculates a projection analysis of a density in the images.

Then, the division determination unit 1 determines the areas having greater width than the predetermined value of the areas of low density in the density projection distribution as the position pattern of the identified partitioning candidate position, and excludes areas existing near the edge of the input image within the partitioning candidate position of the first direction.

The division determination unit 1 determines whether the partitioning candidate position of the first direction exists in an equally-divided position.

The division determination unit 1 then performs a projection analysis on images of input image data, for example, along with a second direction which is a longitudinal direction and calculates a projection analysis of a density in the images.

Then, the division determination unit 1 determines the areas having greater width than the predetermined value in the areas of low density in the density projection distribution as the position pattern of the identified partitioning candidate position, and excludes areas existing near the edge of the input image within the partitioning candidate position of the second direction.

The division determination unit 1 determines whether the partitioning candidate position of the second direction exists in an equally-divided position.

Subsequently, the division determination unit 1 compares the combinations of a partitioning candidate number in the first direction and a partitioning candidate number in the second direction with a combination pattern predetermined in accordance with the partition number of the image (pattern predetermined for each division condition, as shown in FIG. 4), and determines that the image is divided into a partition number to which the pattern matches.

As in the case of using reference areas, applying a projection analysis to a division determination also enables the division determination unit 1 to determine from the changes in image features (density projection distribution) in the image determined by a projection analysis as to whether an image is a split image; and if the image is a split image, to determine whether the split image is adapted to N-up printing. According to such configuration, a user is not required to determine the partition number of the image, thereby facilitating the subsequent setting regarding printing of the image data.

In the embodiments described above, the present invention is implemented by being adapted to the image forming device 100; however, the embodiments are not limited to such a configuration. For example, the present invention is also provided with an image processing device only equipped with the function of the division determination unit 1 in the image forming device 100. In this case, the image processing device may also be an ASIC (Application Specific Integrated Circuit) provided with the function of the division determination unit 1. The present invention is also provided in the form of recording the image processing program PRG for the division determination to various recording medium such as a magnetic disc, a floppy disk (trade mark), a CD (Compact Disk), a DVD (Digital Versatile Disk), and RAM.

As described above, the present invention provides an image processing device including a division determination part for determining a partition number of an image in input image data; calculating image features of the image in the image data, the features existing in reference areas predetermined in correspondence with the blank spaces between split images, and according to the calculation based on the image features, determining the partition number of the image in the image data.

According to the image processing device, on the basis of the image features in reference areas, it is possible to determine the partition number of an image by a division determination part. According to the configuration, a user is not required to determine as to whether an image is a split image; and if the image is a split image, to determine whether the split image is adapted to N-up printing, thereby facilitating the subsequent setting regarding printing image data.

In an embodiment, the division determination part of the image processing device according to an embodiment of the invention identifies the reference area in which an image does not exist, by comparing the image features in reference areas with a predetermined threshold value and determines the partition number of the image from the position pattern of the identified reference areas.

As a result of this configuration, it is possible to determine the partition number from the position pattern of the identified reference areas.

Furthermore, the present invention provides an image processing device characterized by including a division determination part for determining the partition number of an image in image data, performing a projection analysis on the image in the image data, calculating changes of image features in the image data, and, on the basis of the changes, determining the partition number of the image in the image data.

With the image processing device, the partition number of an image is determined by a division determination part on the basis of the changes of image features in the image data determined by a projection analysis. According to the configuration, a user is not required to determine whether an image is a split image, or if the image is a split image, to determine whether the split image is adapted to N-up printing, thereby facilitating the setting of printing preferences on the basis of the image data.

In an embodiment, the division determination part of the image processing device according to an embodiment of the invention, on the basis of the changes, identifies the partitioning candidate position, and from the position pattern of the identified partitioning candidate position, determines the partition number of an image.

As the result of this configuration, it is possible to determine the partition number of an image from the position pattern of the identified partitioning candidate position.

In an embodiment, the division determination part of the image processing device according to an embodiment of the invention determines the partition number of an image, by using the density distribution of the image in the image data as image features.

In an embodiment, the division determination part determines the partition number of an image by using the edge information of the image in the image data as the image features.

In an embodiment, the division determination part determines the partition number of an image from the number of each separated edge of the image in the image data.

As a result of this configuration, it is possible to determine the existence of a split image accurately and easily.

In an embodiment, the image processing device according to an embodiment of the invention is provided with a display for displaying the determination result acquired by the division determination part.

A display with such configuration enables a user to acknowledge a division determination result easily.

In an embodiment, the display of the image processing device according to an embodiment of the invention, at the time of outputting an image, displays the candidates of the partition number of the outputting image.

A display having such configuration enables a user to recognize the partition number of the outputting image and to select the partition number easily.

In an embodiment, the image processing device according to an embodiment of the invention, is provided with an image reading part for reading a printed image and outputting the image as image data.

By an image reading part having such configuration, it is possible to read an image printed on a recording material and transmit the image as image data to a division determination result so as to perform division determination.

In an embodiment, the image processing device is provided with an image forming part for forming an image on a recording material.

By an image forming part, it is possible to print the images in the image data output from an image processing device.

The present invention provides an image processing method for determining the partition number of a split image in the image data on the basis of the input image data; the method including: calculating image features of the image in the image data, the features existing in reference areas predetermined in correspondence with the blank spaces between the split images; and on the basis of the image features, determining the partition number of the image in the image data.

By this image processing method, it is possible to determine the partition number of an image on the basis of the image features in reference areas. As a result of such configuration, a user is not required to determine whether a read image includes a split image; and when the image is a split image, to determine whether the split image is adapted to N-up printing.

The present invention provides an image processing method for determining the partition number of an image in the image data on the basis of the input image data; the method including: calculating changes of image features in the image data by performing a projection analysis on the image in the image data; determining the partition number of the image in the image data on the basis of the changes.

By the image processing method, it is possible to determine the partition number of an image from the changes of image features in the image data determined by a projection analysis. As a result of such configuration, a user is not required to determine whether a read image includes a split image; and when the image is a split image, to determine whether the split image is adapted to N-up printing.

The present invention provides a program for causing a computer to determine the partition number of an image in the image data on the basis of the input image data; the program realizes the functions including: calculating image features of the image in the image data, the features existing in reference areas predetermined in correspondence with the blank spaces between the split images; and on the basis of the image features, determining the partition number of the image in the image data.

The program enables a computer to determine the partition number of an image on the basis of the image features in reference areas. As a result of such configuration, a user is not required to determine whether a read image includes a split image; and when the image is a split image, to determine whether the split image is adapted to N-up printing.

The present invention provides a program for causing a computer to determine the partition number of an image in the image data on the basis of the input image data; the program realizes the functions including calculating changes of image features in the image data by performing a projection analysis on the image in the image data; determining the partition number of an image in the image data on the basis of the changes.

The program enables a computer to determine the partition number of an image from the changes of image features in the image data determined by a projection analysis. As a result of such configuration, a user is not required to determine whether a read image includes a split image; and when the image is a split image, to determine whether the split image is adapted to N-up printing.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments, and with various modifications as are suited to a particular use. It is intended that the scope of the invention be defined by the following claims and their equivalents.

The entire disclosure of Japanese Patent Application No. 2005-67913 filed on Mar. 10, 2005 including specification, claims, drawings and abstract is incorporated herein by reference in its entirety.

What is claimed is:

1. An image processing device comprising:
a division detection unit that calculates image features of an image from reference areas which are predetermined based on blank spaces of partitions of the image,
identifies an image free reference area based on the image features, and
detects a partition number of the image from a position pattern of the identified reference areas, wherein the partition number of the image represents a number of split images already partitioned in the image.

2. The image processing device of claim 1, wherein the division unit, by comparing the image features in reference areas with a predetermined threshold value, identifies the image free reference area.

3. The image processing device of claim 1, wherein the division detection unit detects the partition number of the image by using density distribution of the image as an image feature.

4. The image processing device claim 1, wherein the division detection unit detects the partition number of the image by using edge information of the image as an image feature.

5. The image processing device of claim 1, wherein the division detection unit detects the partition number of the image by referencing to the image without edge area of the image.

6. The image processing device of claim 1, further comprising:
a display for displaying a detection result acquired by the division detection unit.

7. The image processing device of claim 6, wherein the display displays candidates of the partition number of the image, when the image is outputted.

8. The image processing device of claim 1 further comprising: an image reading unit for reading a printed image and outputting the image as image data.

9. The image processing device of claim 1 further comprising: an image forming unit for forming an image on a recording material.

10. An image processing method executed in a computer-readable medium comprising:
calculating image features of an image, from reference areas which are predetermined based on blank spaces of partitions of the image by using a processor;
identifying an image free reference area based on the image features; and
detecting a partition number of the image from a position pattern of the identified reference areas, wherein the partition number of the image represents a number of split images already partitioned in the image.

11. A storage medium readable by a computer, the storage medium storing a program of instructions executable by the computer to perform a function for processing an image, the function comprising:
calculating image features of the image from reference areas which are predetermined based on blank spaces of partitions of the image,
identifying an image free reference area based on the image features, and
detecting a partition number of the image from a position pattern of the identified reference areas, wherein the partition number of the image represents a number of split images already partitioned in the image.

12. The image processing device of claim 1,
wherein the division detection unit extracts a reference area map data, determines an average density for the reference area map data, compares the average density to a predetermined density threshold value, and determines if the image data can be equally partitioned into N number of partitions.

13. The image processing method of claim 10 further comprising:
extracting a reference area map data;
determining an average density for the reference area map data;
comparing the average density to a predetermined density threshold value; and
determining if the image data can be equally partitioned into N number of partitions.

14. The storage medium according to claim 11 further comprising:
extracting a reference area map data;
determining an average density for the reference area map data;
comparing the average density to a predetermined density threshold value; and
determining if the image data can be equally partitioned into N number of partitions.

* * * * *